United States Patent Office 3,052,525
Patented Sept. 4, 1962

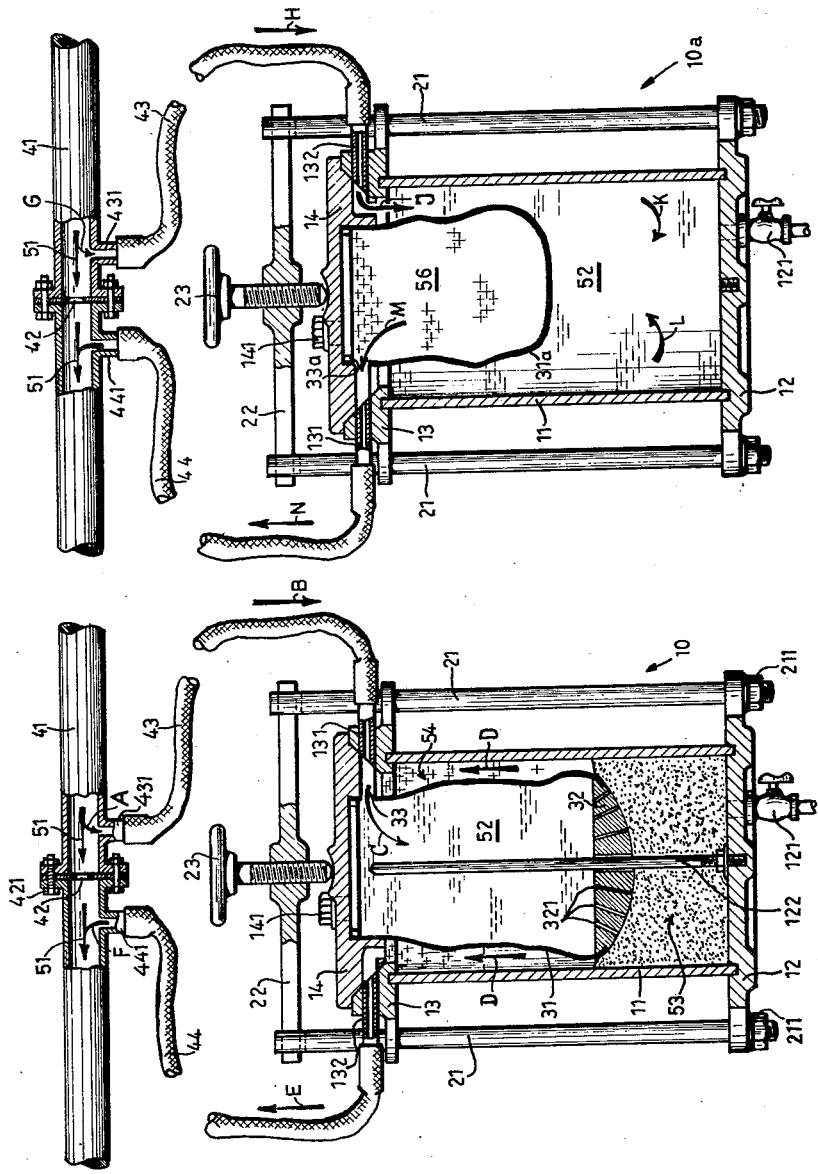

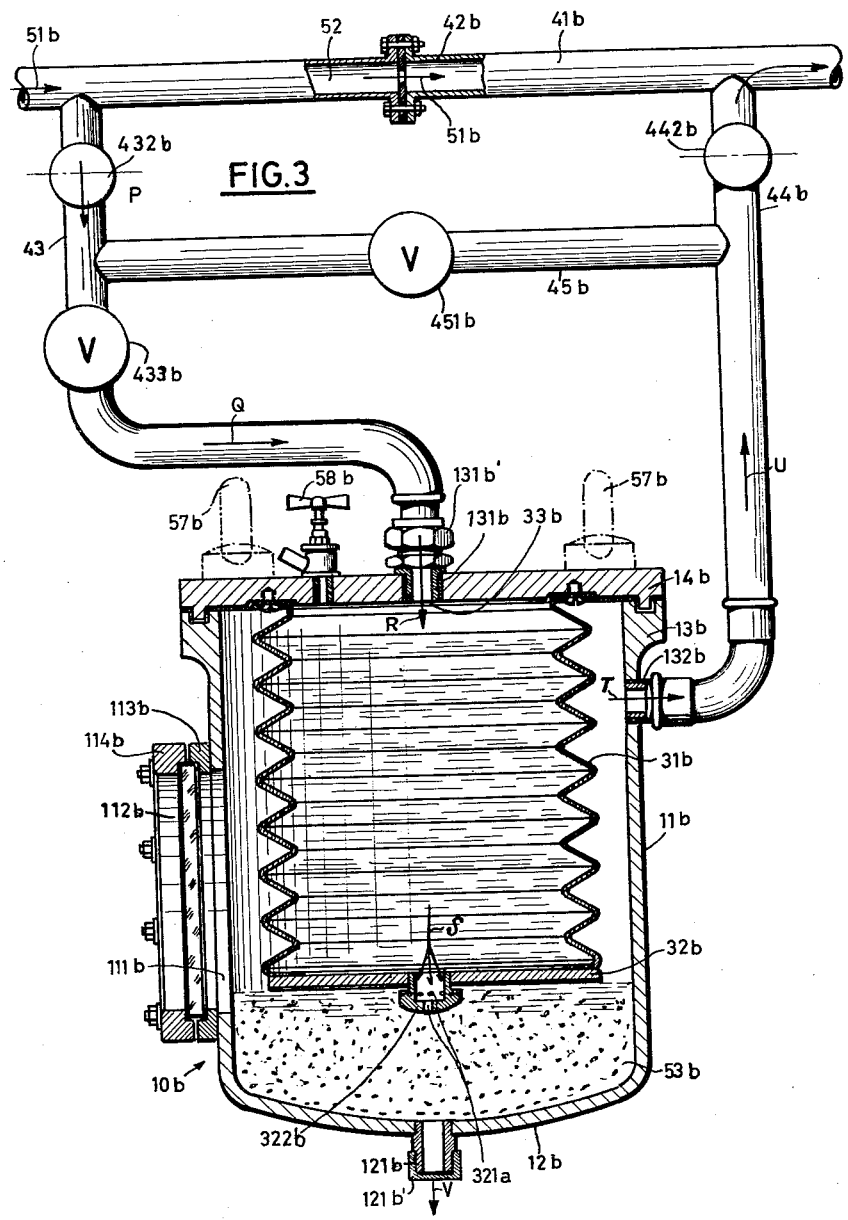

3,052,525
APPARATUS FOR INTRODUCING CONTROLLED QUANTITIES OF LIQUIDS AND SOLUTES INTO A FLUID MEDIUM
Ernst Vogelmann, Bottwarbahnstrasse 70, Heilbronn-Sontheim, Germany, and Otto Wurst, Im Kreuzgrund 12, Heilbronn-Bockingen, Germany
Filed Dec. 29, 1958, Ser. No. 783,517
Claims priority, application Germany Dec. 27, 1957
6 Claims. (Cl. 23—272.7)

The present invention relates to dosing apparatus in general, and more particularly to a system for distributing predetermined percentages of a liquid or dissolved treating substance in a fluid stream.

In devices of such type, only a part of the fluid is brought into contact with the treating substance. Such part of the fluid mixes with the treating agent when the latter is in liquid form, or continuously dissolves a solid treating substance, and returns into the main fluid stream wherein the entrained liquid or dissolved treating substance is uniformly distributed in the fluid body.

In its simplest form, a dosing device of such type usually comprises a preferably cylindrical receptacle which contains the treating substance and is formed, adjacent to its upper end, with intake and discharge openings for the fluid. Only the upper surface of a solid, e.g. pulverulent or granular, treating medium is dissolved; therefore, the concentration of treating substance in the fluid medium decreases as the supply of treating substance in the receptacle diminishes.

In another type of prior apparatus, the receptacle comprises connections for entry and discharge of a fluid medium, e.g. water, and a container is installed in the receptable up, e.g. water, and a container is installed in the receptable to be filled with a treating substance. The latter is in contact with advancing fluid throughout the entire height thereof. This arrangement has the same disadvantage as the one mentioned hereinabove, i.e. the concentration of treating substance in the fluid medium decreases at the rate at which the supply of treating substance in the container diminishes. This is due to the fact that, as the said pulverulent, granular or otherwise comminuted solid treating substance is continuously dissolved upon contact with the fluid medium, its surface of contact with the fluid diminishes and, consequently, lesser quantities of treating substance will become dissolved as the operation continues. In addition, the resistance of a comminuted treating substance to the flow of a fluid is subject to constant changes. Thus, a crystalline treating material may shrink together to constitute a practically impenetrable barrier to the flow of a fluid. Even if the fluid is still able to continue its flow through such shrunk-together treating material, its flow is at an uneven and unpredictable rate. A further disadvantage of such prior apparatus is in that, whenever the operation, i.e. the flow of a fluid medium therethrough, is interrupted or discontinued, considerable quantities of fluid remain in the receptacle which brings about undesirably high concentration of dissolved treating agent in the entrapped fluid.

An important object of the present invention is to provide a dosing device which is capable of evenly distributing a treating agent in the stream of a fluid medium regardless of the quantity of treating material in the apparatus.

Another object of the invention is to provide an apparatus of the above described characteristics which is capable of distributing soluble solid as well as liquid treating agents.

A further object of the invention is to provide a dosing apparatus which may be readily taken apart for inspection, repair, replacement of parts, and introduction of new quantities of treating material.

A still further object of the instant invention is to provide an apparatus for introducing measured quantities of liquid or soluble solid treating materials into a fluid stream which is so constructed that it insures uniform and fully automatic mixing and/or dissolution of treating material in a fluid stream.

An additional object of the invention is to provide a dosing device of the above described character which is equally effective for continuous and intermittent introduction of treating material into a fluid stream.

The above and certain other objects of the invention are attained by the provision of an inner receptacle or insert, made either entirely or in part of preferably resiliently expansible and contractible material, and so installed in an outer receptacle through which a stream of fluid is adapted to flow that it contracts or expands, i.e. that it changes its volume, at a rate proportional with changes in the quantity of treating material in the dosing apparatus.

When the soluble treating agent is in pulverulent, granular or otherwise comminuted form, the fluid to be treated is introduced into the inlet of an inner receptacle or insert and the latter is provided with a preferably solid bottom having one or more channels or outlets to permit discharge of fluid from the insert into the outer receptacle. The outer receptacle receives the treating agent and, while the latter gradually dissolves, the inner receptacle expands at the same rate and thereby brings unchanged quantities of fluid into intimate contact with the upper layer of gradually diminishing mass of treating material. The bottom of apertured resilient insert which is utilized in connection with comminuted treating agents is preferably formed with an underside of convex shape, and its weight contributes to expansion of the insert at the rate at which the level of treating material in the outer receptacle descends. Hence, regardless of the quantity of treating material in the apparatus, the amounts of fluid in contact therewith remain unchanged. In addition to the weight of the aforementioned solid bottom in such an expansible and contractible insert, the pressure head of fluid which fills the insert also contributes to uniform and uninterrupted expansion of the insert as long as a stream of fluid is led into the insert and through its apertured solid bottom into contact with the treating material. The fluid stream which now contains a certain quantity of dissolved treating material is then led from the apparatus through the outlet of the outer receptacle and preferably back into the main fluid line from which the stream of fluid was originally diverted.

The just described form of our novel dosing apparatus is equally useful for intermittent introduction of a fluid into contact with a solid treating material because the quantity of fluid in contact with the treating material, while the entry of additional fluid is prevented, is relatively small and the entrapped fluid is in contact only with a relatively small exposed area of treating material. The main zone of the exposed surface of treating material is covered by the solid bottom of resilient insert; the underside of this bottom, as above mentioned, is preferably of convex shape.

It is often preferred to guide the resilient insert in its movements into expanded or contracted position by a rod or the like which latter may extend into the outer receptacle of the apparatus and traverses the bottom of the insert.

By exchaning the insert having an apertured solid bottom for a resilient insert whose bottom is leakproof, the apparatus may be utilized to introduce predetermined quantities of a liquid treating agent into the fluid medium. In such instances, the fluid acts as a pressure medium and is introduced at a constant or variable rate and under constant or variable pressures through the inlet of and into the outer receptacle of our apparatus, and causes contraction of the resilient insert whose discharge port or outlet delivers the liquid treating material into the stream of fluid leaving the receptacle, or directly into the main fluid line. When the apparatus is equipped with a leakproof, wholly resilient insert, the treating agent in liquid form may be expelled therefrom into the main fluid line by a pressure medium other than the fluid stream diverted from the main line, provided, however, that the pressure of such other medium be proportional with the rate at which the fluid flows through the main line.

The insert may assume the shape of a bag or pouch whose bottom and/or only the walls are of resilient or expansible material, e.g. rubber or a suitable synthetic substance; or it may be in the form of a bellows to insure even more uniform expansion or contraction at the rate at which the supply of treating material in the apparatus diminishes.

The connection between the main fluid line and the dosing apparatus may consist of flexible or rigid conduits, and the cover of the outer receptacle to which the resilient insert is connected is readily detachable or comprises a suitable pour-in hole to permit introduction of a new supply of treating material into the apparatus. Suitable baffle means, valves and cocks control the flow of fluid in the main line and in the conduits connecting the main line with the dosing apparatus, as well as the discharge of fluid from the outer receptacle before the supply of treating agent is renewed.

In the present description and in the appended claims, the term "fluid" is intended to denote a liquid substance to which a solute or liquid treating agent is to be added at a predetermined rate. The treating agent, when in solid (i.e. pulverulent, granular or crystalline) form, is always soluble in the fluid, and the term "treating" is meant to include any type of action which the material whose controlled discharge or dissolution is brought about by the novel dosing apparatus may have on the fluid. For example, the fluid to be treated may be water, alcohols, benzines and other hydrocarbones, oils and other chemical fluids; and the treating agent may be phosphoric salts, hydracine-sulphates, amines, sodium-hypochlorites and others.

The novel features which are considered as characteristic for the invention are set forth in particular in the appended claims. The invention itself, however, both as to its construction and its method of operation, together with additional objects and advantages thereof, will be best understood from the following description of three specific embodiments when read in connection with the accompanying drawings, in which:

FIG. 1 is a central vertical section through one form of the dosing apparatus shown connected to a main fluid line by flexible conduit means with certain portions of the fluid line and of the conduits broken away, this form of apparatus being utilized for continuously dissolving a pulverulent or granular treating substance in the fluid.

FIG. 2 is similar view of a slightly modified apparatus which is utilized for admixing fixed quantities of a liquid substance to the fluid; and FIG. 4 illustrates in similar view a further modification of our dosing apparatus which may be utilized for dissolving comminuted treating material in the fluid the apparatus being connected to the main fluid line by rigid, valve-controlled and interconnected conduits.

Refering now in greater detail to the drawings, and first to FIG. 1, the dosing apparatus comprises an outer receptacle 10 including a preferably cylindrical wall 11 which may be of glass or any other suitable material, a bottom or base 12, a top or front flange 13, and a cover or lid 14 which latter carries an insert or inner receptacle 31. Parts 11 to 14 are held together by a series of tension rods 21 which extend through aligned openings in members 12 and 13, by nuts 211, by a cross piece 22, and by a handwheel-actuated tightening screw 23 whose lower end tightly presses the peripheral zone of cover 14 against the flange 13. Insert 31, whose wall is of preferably resiliently expansible material, comprises a solid bottom member 32 formed with a series of radially arranged bores or channels 321. At its upper end, the wall of insert 31 is formed with a port 33 which serves as an inlet for the fluid medium 52 to be treated by contact with the substance 53 filling the lower part of outer receptacle 10 between members 12 and 32. In FIG. 2, opening 33a in a modified insert 31a serves as a discharge port or outlet for a liquid treating substance 56.

Connecting nipples 131 and 132 are fixed to or integral with the flange 13, and the cover member 14 is formed with a pour-in hole or port which is sealable by a threaded plug 141. Bottom 12 carries a discharge or drain valve 121, and preferably also an upwardly extending guide rod 122 which traverses the bottom member 32 and projects into the interior of insert 31. Member 122 thus guides the apertured bottom member 32 when the resilient portion of insert 31 expands or contracts.

The improved dosing or quantity regulating apparatus is connected to a main line or pipe 41 by flexible conduits 43, 44 the lower ends of which are connected to nipples 131, 132, respectively. The upper ends of conduits 43, 44 are connected to nipples 431, 441, respectively, which latter communicate with the interior of pipe 41 at opposite sides of an apertured transverse baffle plate 42 which is received between the end flanges of tubular sections forming part of pipe 41 and is connected thereto by threaded bolts and nuts 421. Baffle 42 brings about a secondary or bypass flow of fluid 52 from pipe 41 into the nipple 431 (arrow A), through flexible conduit 43 (arrow B), through inlet or nipple 131, through intake port 33 into the interior of insert 31 (arrow C), through channels or outlets 321 into contact with medium 53, thence about resilient walls of insert 31 (arrows D), through outlet or nipple 132, through conduit 44 (arrow E), and through nipple 441 (arrow F) to return into the main body of fluid flowing in pipe 41 in the direction of arrows 51.

In the embodiment of FIG. 1, the treating substance 53 filling the lower half of outer receptacle 10 is in pulverulent form. Its uppermost layer dissolves upon contact with fluid or solvent 52; thus the fluid passing in the direction of arrows D between wall 11 and the resilient portion of insert 31 into and through conduit 44 (arrow E) is a solution of substance 53 in fluid 52. The weight of bottom member 32 is so selected that it causes expansion of resilient wall forming part of insert 31 at the same rate at which the substance 53 is dissolved by contact with the solvent 52 flowing downwardly through channels 321. The convex undersurface of bottom member 32 thus remains in continuous and full contact with the upper layer of pulverulent mass 53. The height of the latter is gradually reduced and the insert, guided by rod 122, follows in downward direction to continuously deliver new quantities of fluid 52 into contact with the soluble pulverulent treating material.

For introduction of a new supply of treating substance 53, conduits 43, 44 are removed from respective nipples, 131, 132, and the valve 121 is opened to evacuate the fluid remaining in outer receptacle 10 and in insert 31. The clamping or tightening means 22, 23 is thereupon removed to permit lifting of cover 14 with insert 31 in upward direction. The outer receptacle can be refilled with substance 53 through the concentric opening in flange 13.

It will be seen that, due to at least partial expansibility and contractibility of insert 31, the quantity of fluid 52 in contact with treating substance 53 remains unchanged regardless of the height to which the latter fills the interior of outer receptacle 10. Therefore, the percentage of solute 53 in bypass stream of fluid flowing through flexible conduit 44 back into pipe 41 remains constant and, consequently, the percentage of dissolved substance 53 in the fluid flowing through pipe 41 at the lefthand side of baffle 42, too, remains unchanged.

If a liquid treating medium is to be admixed to fluid 52, a slightly modified apparatus is utilized, as is shown in FIG. 2. This apparatus comprises an outer receptacle 10a and a different insert 31a, the latter for reception of treating medium in the form of a liquid 56. The entire insert is made of a resiliently expansible and contractible material and its bottom is leakproof, i.e. without apertures corresponding to channels or outlets 321 in the bottom 32 shown in FIG. 1. The fluid 52 acts as a pressure medium because the connections between nipples 131, 132 and conduits 43, 44 are interchanged. Thus, inlet or nipple 132 is connected to one end of conduit 43 and introduces the by-pass stream of fluid 52 into the interior of outer receptacle 10a, the fluid flowing through nipple 431 in the direction of arrow G, through conduit 43 in the direction of arrow H, and through inlet or nipple 132 into the interior of outer receptacle 10a (arrows J, K, L) to fill the space between inner receptacle or insert 31a and outer wall 11. Depending upon the pressure of fluid 52 against the outer side of contractible insert 31a, a corresponding quantity of liquid treating substance 56 is continuously discharged in the direction of arrow M and flows through discharge port or outlet 33a, nipple or outlet 131, conduit 44 (arrow N) and nipple 441 to enter the pipe 41 at the left-hand side of baffle plate 42 to be admixed to the main body of fluid 52. The flow of fluid 52 in pipe 41 is in the direction of arrows 51.

Due to resilient nature of insert 31a, all the liquid treating substance may be expelled therefrom and discharged through conduit 44 into pipe 41. Upon disconnection of conduit 43 from nipple 132 and discharge of fluid 52 which fills the interior of outer receptacle 10a through valve element 121 in bottom 12, only the plug 141 must be removed for refilling of insert or inner receptacle 31a with a new supply of treating liquid 56.

As mentioned hereinbefore, resilient inner receptacle 31a need not necessarily be subjected to pressure by the fluid flowing through pipe 41. Another fluid may be utilized provided, however, that its pressure upon insert 31a be such as to introduce predetermined constant or changing quantities of treating material into the line 44 and thence into pipe 41. It will be understood that the outer receptacle 10a is then sealed from nipple 131 and that another escape route is provided for discharge of fluid from the outer receptacle.

The modified dosing apparatus of FIG. 3 comprises a unitary outer receptacle 10b consisting of wall 11b and bottom or base 12b, and a cover 14b which latter rests upon the flange 13b at the upper end of preferably cylindrical member 11b. The resilient insert comprises a bellows 31b whose upper end is fixed to the underside of cover 14b by screws 142b, and whose lower end consists of a discoid plate or weight 32b concentrically supporting a distributor head 322b formed with a plurality of preefrably radially disposed outlets or channels 321a.

Cover 14b concentrically supports a nipple 131b which is connected to the lower end of rigid conduit 43b. The upper end of conduit 43b communicates with pipe 41b at the left-hand side of baffle plate 42b. It will be noted that fluid 52, advancing in the direction of arrow 51b, flows in a direction opposed to that of arrows 51 in the main line 41 of FIGS. 1 and 2. Baffle plate 42b causes a certain quantity of fluid 52 to flow through conduit 43b (arrows P, Q), through nipple 131b, through inlet port 33b (arrow R), into the interior of inner receptacle or insert 31b, into head 322b (arrows S) and through channels or outlets 321b into contact with pulverulent or granular treating agent 53b. Having dissolved the upper layer of material 53b, fluid 52 is discharged from outer receptacle 10b through outlet or nipple 132b (arrow T) and flows into return conduit 44b (arrow U) to reenter the pipe 41b at the right-hand side of baffle member 42b.

Bottom plate 12b carries a short discharge tube 121b which is normally sealed by a cap 121b'. Parts 121b, 121b' consistute a simple valve analogous in its function to valve 121 shown in FIGS. 1 and 2. When, after a certain period of time, medium 53b is dissolved by fluid 52 passing through outlets or channels 321a, a new supply of treating medium may be introduced by first removing cap 121b' to release fluid 52 from the receptacle 10b and insert 31b (arrow V), by releasing the connection 131b' between nipple 131b and conduit 43b, and by lifting cover 14b with bellows 31b off the flange 13b. Removal of member 14b is facilitated by handgrip members 57b which are shown in phantom lines. The cover also carries a discharge cock 58b through which fluid may be released from insert 31b. Member 58b may be replaced by an automatic safety valve, if desired.

Wall 11b is formed with a relatively large cutout 111b which is sealed by a transparent or translucent plate 112b received between retaining frame members 113b, 114b. Plate 112b enables an attendant to observe the level of treating material 53b in outer receptacle 10b. As in the embodiment of FIG. 1, inner receptacle or insert 31b, weighted by its bottom plate 32b and by the pressure head of fluid 52 therein, follows the descent of the upper level of treating agent 53b in the direction toward bottom 12b, and thus insures that the agent 53b is dissolved in fluid 52 at a constant rate.

Conduits 43b, 44b are connected by a line 45b in which a regulating valve 451b is installed. Thus, at least a portion of fluid 52 may bypass the outer receptacle 10b if the valve 451b is at least partially open. In addition, fluid 52 may be discharged from conduit 43b and from conduit 44b through cocks 432b, 442b, respectively. A precision regulating valve 433b is installed in conduit 43b between connecting line 45b and nipple 131b. Parts 45b, 451b, 432b, 442b and 433b enable an operator to control within a very wide range the percentage of solute 53b in solvent 52.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an apparatus for introducing measured quantities of a dissolved normally solid treating material into a fluid stream, in combination: an outer receptacle for reception of a supply of soluble solid treating material, said outer receptacle having a discharge opening; an inner receptacle located above the treating material in said outer receptacle, said inner receptacle having an inlet for admission of fluid thereto and an expansible and contractible tubular side wall having a bottom edge, a rigid, substantially disk-shaped bottom wall being secured to said expansible and contractible tubular side wall along said bottom edge thereof, said bottom wall resting directly on the solid treating material in said outer receptacle and having outlet means therethrough opening directly into said solid treating material, whereby all the fluid flowing through said outlet means into said outer receptacle is compelled to come into contact with the solid treating material to continuously dissolve and to entrain the dissolved treating material through said discharge opening, the inner receptacle expanding at the rate at which the dissolved treating material is entrained by said fluid to maintain said bottom wall in contact with the solid treating material in said outer receptacle.

2. In an apparatus for introducing measured quantities of a dissolved normally solid treating material into a fluid stream, in combination: an outer receptacle for receiving a supply of soluble solid treating material, said outer receptacle having a cover and a discharge opening; an inner receptacle depending from the cover in said outer receptacle, said inner receptacle having an inlet for admission of fluid thereto and an expansible and contractible tubular side wall attached at its top to said cover and having a bottom edge, a rigid, substantially disk-shaped bottom wall being secured to said expansible and contractible tubular side wall along said bottom edge thereof, said bottom wall being provided with a convex underside in direct contact with the solid treating material in the outer receptacle and having a plurality of outlets therethrough opening directly into said solid treating material, whereby all the fluid flowing through said plurality of outlets into said outer receptacle is compelled to come into contact with the solid treating material to continuously dissolve and to entrain the dissolved treating material through said discharge opening, the weight of said bottom wall and of fluid in said inner receptacle being such that the latter expands and the underside of said bottom wall remains in continuous contact with the solid treating material in said outer receptacle.

3. Apparatus as claimed in claim 1, in which the tubular side wall of the inner receptacle consists of flexible resilient material.

4. Apparatus as claimed in claim 1, in which the tubular side wall of the inner receptacle is in the form of a bellows.

5. Apparatus as claimed in claim 1, in which the rigid, substantially disk-shaped bottom wall of the inner receptacle has a guide bore therein, and the outer receptacle includes a bottom member, and in which a guide rod is secured to said bottom member of the outer receptacle and extends through said guide bore of the bottom wall of the inner receptacle for guiding said bottom wall when the latter moves within the outer receptacle.

6. In an apparatus for introducing quantities of a dissolved, normally solid treating material into a fluid stream, in combination: an outer receptacle for receiving a supply of the solid treating material, said outer receptacle including a side wall, a bottom, and a discharge opening; an inner receptacle located in said outer receptacle above said supply of treating material and having an inlet for admission of fluid thereto, said inner receptacle including an extensible and collapsible tubular side wall having a bottom edge and located in the proximity of said side wall of the outer receptacle so as to leave a relatively narrow space therebetween, a rigid, substantially disk-shaped bottom wall being secured along its peripheral edge to said bottom edge of the extensible and collapsible tubular side wall and having outlet means therethrough opening generally toward said bottom of the outer receptacle directly into said solid treating material; said rigid, substantially disk-shaped bottom wall extending over the major portion of the upper surface of said supply of solid treating material and resting thereon in direct contact therewith around said outlet means, whereby passage of fluid from said outlet means to said discharge opening will be permitted only through said solid treating material to dissolve said treating material and entrain it through said discharge opening, said tubular side wall of the inner receptacle extending at the rate of dissolution of the treating material for maintaining said direct contact between the bottom wall of the inner receptacle and said solid treating material present in the outer receptacle.

References Cited in the file of this patent

UNITED STATES PATENTS

| | | |
|---|---|---|
| 2,239,502 | Gleason | Apr. 22, 1941 |
| 2,394,415 | Wilkinson et al. | Feb. 5, 1946 |
| 2,573,299 | Bast | Oct. 30, 1951 |
| 2,703,176 | Shuldener | Mar. 1, 1955 |
| 2,802,724 | Johnson | Aug. 13, 1957 |
| 2,818,324 | Thornton | Dec. 31, 1957 |